US012637052B2

(12) United States Patent
Vollert et al.

(10) Patent No.: US 12,637,052 B2
(45) Date of Patent: May 26, 2026

(54) CONTROL UNIT AND METHOD FOR OPERATING A BRAKE SYSTEM OF A VEHICLE

(71) Applicant: Robert Bosch GmbH, Stuttgart (DE)

(72) Inventors: Herbert Vollert, Vaihingen/Enz (DE); Hagen Kuckert, Bietigheim-Bissingen (DE); Johannes Willkomm, Yokohama (JP)

(73) Assignee: ROBERT BOSCH GMBH, Stuttgart (DE)

( * ) Notice: Subject to any disclaimer, the term of this patent is extended or adjusted under 35 U.S.C. 154(b) by 1173 days.

(21) Appl. No.: 17/596,153

(22) PCT Filed: May 27, 2020

(86) PCT No.: PCT/EP2020/064740
§ 371 (c)(1),
(2) Date: Feb. 7, 2022

(87) PCT Pub. No.: WO2020/245006
PCT Pub. Date: Dec. 10, 2020

(65) Prior Publication Data
US 2022/0314945 A1 Oct. 6, 2022

(30) Foreign Application Priority Data
Jun. 7, 2019 (DE) ..................... 10 2019 208 393.5

(51) Int. Cl.
*B60T 13/16* (2006.01)
*B60T 13/14* (2006.01)
*B60T 13/66* (2006.01)

(52) U.S. Cl.
CPC .......... *B60T 13/162* (2013.01); *B60T 13/148* (2013.01); *B60T 13/662* (2013.01); *B60T 2201/03* (2013.01)

(58) Field of Classification Search
CPC ...... B60T 7/042; B60T 13/162; B60T 13/148; B60T 13/662; B60T 13/143; B60T 8/4266; B60T 2201/03
(Continued)

(56) References Cited

U.S. PATENT DOCUMENTS 5,967,624 A 10/1999 Graber et al.
9,061,673 B2 * 6/2015 Weiberle ................... B60T 7/06
(Continued)

FOREIGN PATENT DOCUMENTS

CN 103547493 A 1/2014
CN 104220312 A 12/2014
(Continued)

OTHER PUBLICATIONS

International Search Report for PCT/EP2020/064740 Issued Jun. 26, 2020.

*Primary Examiner* — Thomas W Irvin
(74) *Attorney, Agent, or Firm* — NORTON ROSE FULBRIGHT US LLP

(57) ABSTRACT

A control unit for a brake system of a vehicle. Using a sensor signal, provided by a sensor and is in regard to a distance moved by a driver braking-force transmission component or by a booster force transmission component, the control unit discerns if a movable piston of a master brake cylinder of the brake system is moved by a brake actuating distance equal to a specified, limiting brake actuating distance, and, possibly, to output at least one control signal to a pump control unit of at least one hydraulic pump of the brake system. The pump control unit can be activated by the at least one control signal so that brake fluid may be conveyed from a brake fluid reservoir of the brake system into at least one wheel brake cylinder of the brake system using at least one hydraulic pump controlled by the pump control unit.

9 Claims, 2 Drawing Sheets

(58) Field of Classification Search
USPC ........................................... 303/115.2, 113.4
See application file for complete search history.

(56) References Cited

U.S. PATENT DOCUMENTS

| | | | | |
|---|---|---|---|---|
| 9,932,023 | B2 * | 4/2018 | Vollert ................... | B60T 11/224 |
| 10,173,661 | B2 * | 1/2019 | Rifici ...................... | B60T 7/042 |
| 10,308,231 | B2 * | 6/2019 | Butz ...................... | B60T 13/662 |
| 10,737,674 | B2 * | 8/2020 | Krautter ................ | B60T 13/745 |
| 11,052,891 | B2 * | 7/2021 | Niepelt ................... | B60T 13/66 |
| 2013/0025273 | A1 | 1/2013 | Nozawa et al. | |
| 2013/0181506 | A1 * | 7/2013 | Weiberle ................... | B60T 7/06 |
| | | | | 303/2 |
| 2014/0131154 | A1 | 5/2014 | Ganzel | |
| 2014/0319902 | A1 | 10/2014 | Benzler et al. | |
| 2016/0082938 | A1 * | 3/2016 | Vollert ................. | B60T 13/662 |
| | | | | 303/115.2 |
| 2016/0200306 | A1 * | 7/2016 | Butz .................... | B60T 13/745 |
| | | | | 60/545 |
| 2017/0282878 | A1 * | 10/2017 | Krautter ................ | B60T 13/166 |
| 2018/0141533 | A1 * | 5/2018 | Rifici ........................ | B60T 8/00 |
| 2018/0222464 | A1 * | 8/2018 | Niepelt ................. | B60T 13/588 |

FOREIGN PATENT DOCUMENTS

| | | | |
|---|---|---|---|
| CN | 104973039 A | 10/2015 | |
| DE | 3347618 A1 | 7/1985 | |
| DE | 102010001939 A1 | 8/2011 | |
| DE | 102010002429 A1 | 9/2011 | |
| DE | 102013001775 A1 | 1/2014 | |
| DE | 102013208674 A1 | 11/2014 | |
| DE | 102013224776 A1 | 6/2015 | |
| DE | 112016001537 T5 | 1/2018 | |
| JP | 2012096626 A | 5/2012 | |
| JP | 2013056588 A | 3/2013 | |
| JP | 2013193664 A | 9/2013 | |
| JP | 2015146657 A | 8/2015 | |
| JP | 2015202725 A | 11/2015 | |
| WO | 2006046318 A1 | 5/2006 | |

* cited by examiner

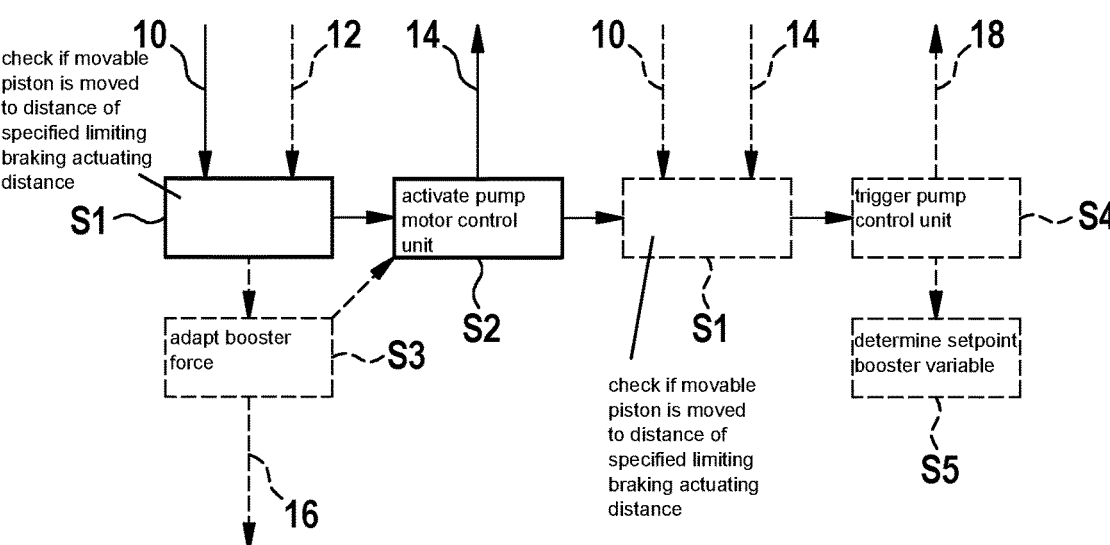

check if movable piston is moved to distance of specified limiting braking actuating distance

S1 activate pump motor control unit

S2 adapt booster force

S3

16 check if movable piston is moved to distance of specified limiting braking actuating distance

S1 trigger pump control unit

S4 determine setpoint booster variable

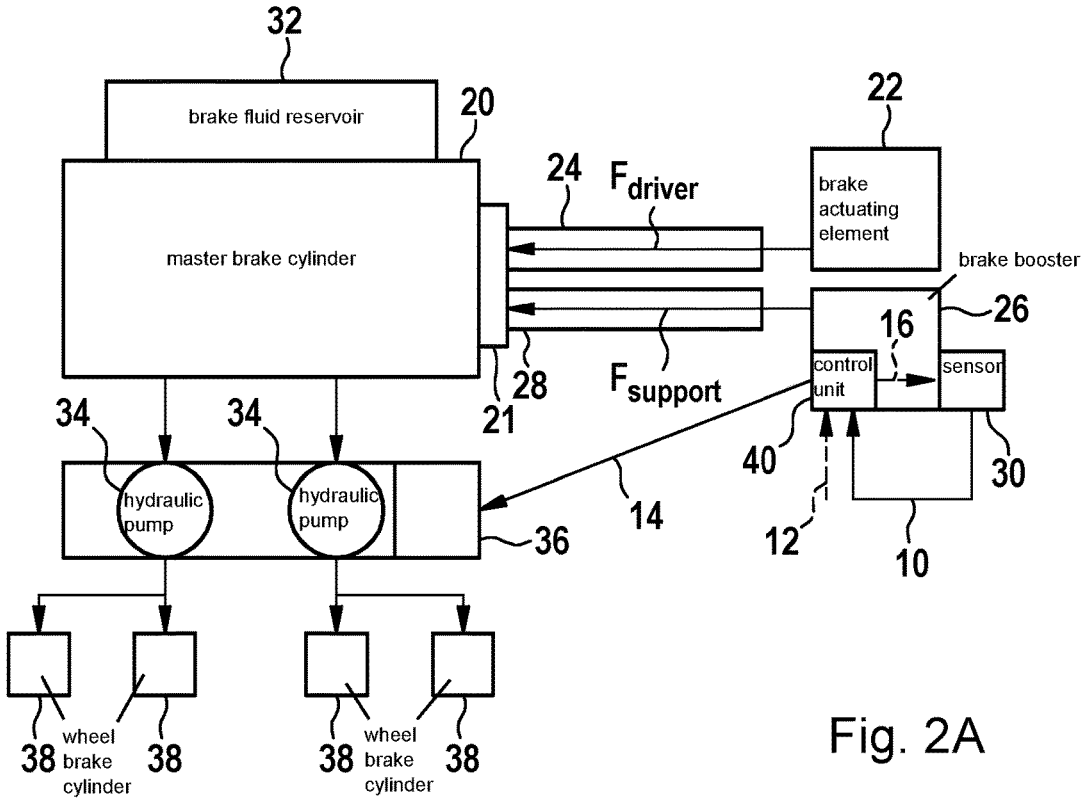

brake fluid reservoir 32 master brake cylinder 20

$F_{driver}$ 24 brake actuating element 22 brake booster 26

21 28

$F_{support}$ control unit 40 sensor

16

30

12

10

14 hydraulic pump 34 hydraulic pump 34

36

38 wheel brake cylinder 38

38 wheel brake cylinder 38

Fig. 2A

CONTROL UNIT AND METHOD FOR OPERATING A BRAKE SYSTEM OF A VEHICLE

FIELD

The present invention relates to a control unit for a brake system of a vehicle, a brake booster for a brake system of a vehicle, and a brake system for a vehicle. The present invention also relates to a method for operating a brake system of a vehicle.

BACKGROUND INFORMATION

In some conventional brake systems, by manipulating a brake actuating element/brake pedal of the vehicle, a driver of a vehicle equipped with the specific brake system may apply the brakes, via a master brake cylinder of the respective brake system, at at least one wheel brake cylinder connected hydraulically to the master brake cylinder; the driver simultaneously being assisted with the aid of the power of a brake booster of the specific brake system. Such a brake system is described, for example, in German Patent Application No. DE 10 2010 001 939 A1.

SUMMARY

The present invention provides a control unit for a brake system of a vehicle, a brake booster for a brake system of a vehicle, a brake system for a vehicle, and a method for operating a brake system of a vehicle.

The present invention provides advantageous options for reacting to a situation, in which, with the aid a of braking force applied by a driver to a brake actuating element of the vehicle/motor vehicle, and/or with the aid of a booster force of a brake booster of the brake system, a movable piston of a master brake cylinder of a brake system of a vehicle/motor vehicle is moved from its starting position into the master brake cylinder by a brake actuating distance equal to a specified, limiting brake actuating distance, by conveying brake fluid, possibly rapidly, into at least one wheel brake cylinder. The limiting brake actuating distance of the movable piston of the master brake cylinder may be understood as, in particular, a maximum possible brake actuating distance of the movable piston. Thus, the present invention is particularly suited for situations, in which further brake actuation into the master brake cylinder is no longer possible, since the brake actuating travel of the movable piston of the master brake cylinder is already equal to the specified, limiting brake actuating travel/maximum possible brake actuating travel. However, even if further brake actuation into the master brake cylinder is no longer possible, the present invention still provides for brake fluid to be conveyed into the at least one wheel brake cylinder of the brake system and ensures, in this manner, reliable deceleration of the specific vehicle/motor vehicle.

Therefore, the provision of a "reserve volume" in the master brake cylinder, which is normally intended to ensure that the brake actuating travel of the movable piston of the master brake cylinder is not/hardly ever equal to the specified, limiting brake actuating travel/maximum possible brake actuating travel, is rendered unnecessary by the present invention. Consequently, the present invention may be used to reduce the length of a master brake cylinder, that is, a maximum dimension of a master brake cylinder along a direction of movement of its movable piston. Thus, a master brake cylinder employed in the case of use of the present invention may have a shorter length of the master brake cylinder than a conventional/standard master brake cylinder. Accordingly, a brake booster interacting with the master brake cylinder may also be designed to be shorter along the direction of movement of the movable piston of the master brake cylinder, which means that the brake booster may be mounted more easily to a vehicle/motor vehicle without the brake booster extending (far) into a passenger compartment. Therefore, the present invention may also be used to reduce a risk of injury to a driver in the case of a crash of his/her vehicle/motor vehicle.

The present invention does not need a current measured value of a master brake cylinder pressure present in the master brake cylinder, and therefore does not need a supply pressure sensor, as well, in order to discern/assess if the brake actuating travel of the movable piston of the master brake cylinder is equal to the specified, limiting brake actuating travel. Consequently, the present invention may contribute to dispensing with the equipping of a brake system using the present invention with a supply pressure sensor.

One may also refer to the advantageous effect of the present invention as an MVR (master cylinder volume replacement) function.

In one advantageous specific embodiment of the present invention, with the aid of at least the sensor signal, which is in regard to the distance moved by the booster force transmission component and is provided by a rotation sensor or a motor current sensor of an electric motor of the brake booster taking the form of an electromechanical brake booster, the control unit is configured to discern or assess if the brake actuating travel of the movable piston of the master brake cylinder is equal to the specified, limiting brake actuating travel. Thus, the specific embodiment of the control unit described here may interact with a type of sensor, which is already commonly used, is relatively inexpensive, and requires comparatively little space.

Additionally taking into consideration a differential travel signal of a differential travel sensor of the brake booster taking the form of an electromechanical brake booster, the control unit is also configured to discern or assess if the brake actuating travel of the movable piston of the master brake cylinder is equal to the specified, limiting brake actuating travel. Therefore, the specific embodiment of the control unit described here may also interact with a differential travel sensor already used normally.

Alternatively, or in addition, in further view of a rod travel signal of a rod travel sensor on the driver braking-force transmission component taking the form of an input rod, the control unit may also be configured to discern or assess if the brake actuating travel of the movable piston of the master brake cylinder is equal to the specified, limiting brake actuating travel. Rod travel sensors may be manufactured relatively inexpensively and require comparatively little space. Therefore, the control unit described here is also suitable for the use of an advantageous type of sensor.

In a further advantageous, specific embodiment of the present invention, if the control unit discerns or assesses that the brake actuating travel of the movable piston of the master brake cylinder is equal to the specified, limiting brake actuating travel, then, with the aid of at least the provided sensor signal, the differential travel signal and/or the rod travel signal, the control unit is additionally configured to determine a setpoint variable regarding a setpoint volumetric flow to be conveyed from the brake fluid reservoir into the at least one wheel brake cylinder, and to activate the pump control unit with the aid of the at least one control signal, in such a manner, that an actual volumetric flow corresponding to the setpoint variable may be conveyed from the brake fluid reservoir into the at least one wheel brake cylinder with the aid of the at least one hydraulic pump controlled by the pump control unit. Thus, the specific embodiment of the control unit described here may additionally communicate, to the control unit, the rate at which additional volume is to be conveyed from the brake fluid reservoir into the at least one wheel brake cylinder.

Preferably, in light of at least the supplied sensor signal, the differential travel signal and/or the rod travel signal, the control unit is also configured to determine a setpoint booster variable regarding a setpoint booster force to be produced with the aid of the brake booster, regarding a setpoint booster forced to be produced with the aid of the brake booster, and to control the brake booster with the aid of at least a booster control signal, in such a manner, that the brake booster provides a booster force corresponding to the setpoint booster variable, via the booster force transmission component. Consequently, the specific embodiment of the control unit described here may be used, in particular, as a brake booster control unit, which eliminates the conventional need to equip the brake booster with a(n) (additional) separate control unit.

As an advantageous further refinement of the present invention, if the control unit discerns or estimates that the brake actuating travel of the movable piston of the master brake cylinder is less than the specified, limiting brake actuating travel, the control unit may be additionally configured to determine the setpoint booster variable in accordance with a specified, first characteristic curve, and if the control unit discerns or estimates that the brake actuating travel of the movable piston of the master brake cylinder is equal to the specified, limiting brake actuating travel, the control unit may be configured to determine the setpoint booster variable in accordance with a specified, second characteristic curve. In this case, as is explained below in more detail, the control unit may improve a brake actuating sensation/pedal sensation of a driver manipulating the brake actuating element, even when a brake actuating distance of the movable piston of the wheel brake cylinder is equal to the specified, limiting brake actuating distance/maximum possible brake actuating distance.

The advantages described above may also be ensured in the case of a brake booster for a brake system of a vehicle, having a corresponding control unit, in accordance with an example embodiment of the present invention.

A brake system for a vehicle also has the advantages described above, if the brake system includes a corresponding control unit in accordance with an example embodiment of the present invention; the master brake cylinder having at least the movable piston; the brake actuating element having at least the driver braking-force transmission component, via which a driver braking force may be transmitted to the movable piston of the master brake cylinder; the brake booster having at least the booster force transmission component, via which a booster force supplied by the brake booster may be transmitted to the movable piston of the master brake cylinder; the sensor, which is configured to supply the sensor signal regarding the distance traveled by the driver braking-force transmission component of the brake actuating element or by the booster force transmission component of the brake booster, to the control unit; the brake fluid reservoir connected to the master brake cylinder; the at least one hydraulic pump, which is connected to the master brake cylinder and has its pump motor control unit; and the at least one wheel brake cylinder connected to a delivery side of the at least one hydraulic pump.

In addition, execution of a corresponding method for operating a brake system of a vehicle also produces the advantages described above, in accordance with an example embodiment of the present invention. It is expressly emphasized that the method for operating a brake system of a vehicle may be refined further in accordance with the specific embodiments of the control unit explained above.

BRIEF DESCRIPTION OF THE DRAWINGS

Additional features and advantages of example embodiments of the present invention are explained below in light of the figures.

FIG. 1 shows a flow chart for explaining a specific embodiment of the method for operating a brake system of a vehicle, in accordance with the present invention.

FIGS. 2A through 2F show a schematic representation of a brake system equipped with a specific embodiment of the control unit, as well as coordinate systems for explaining a method of functioning of the control unit, in accordance with an example embodiment of the present invention.

DETAILED DESCRIPTION OF EXAMPLE EMBODIMENTS

Figures 2B, 2C, 2D, 2E, 2F:
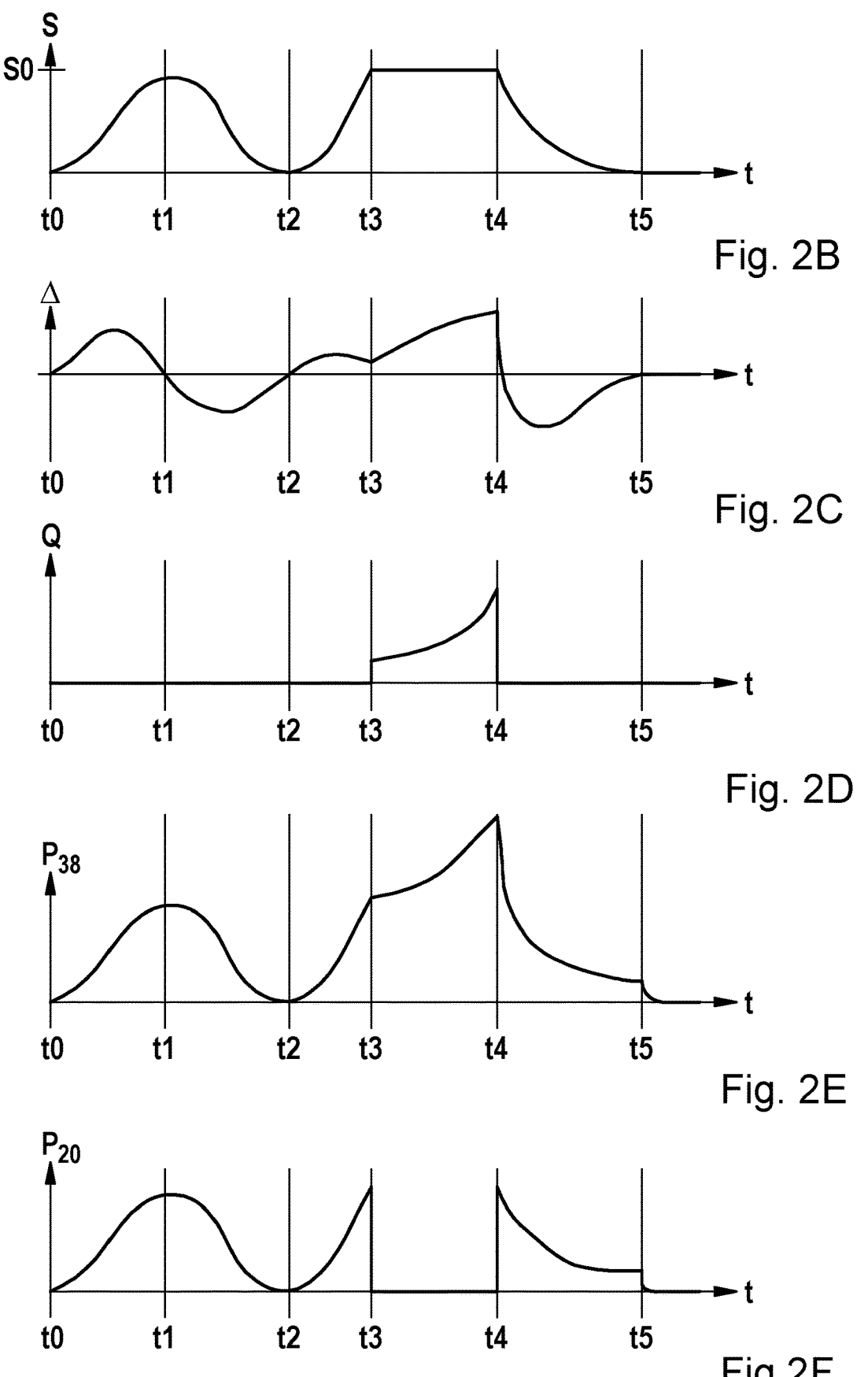

FIG. 1 shows a flow chart for explaining a specific embodiment of the method for operating a brake system of a vehicle, in accordance with the present invention.

The method described in the following may be executed to operate a brake system of a vehicle/motor vehicle. It should be pointed out that an ability to execute the method is not limited to either a special type of the brake system operated or a particular type of vehicle/motor vehicle equipped with the brake system.

In a method step S1, it is checked or assessed if a movable piston of a master brake cylinder of the brake system is moved from its starting position into the master brake cylinder by a brake actuating distance equal to a specified, limiting brake actuating distance. In particular, a position of the movable piston of the master brake cylinder, at which a chamber of the master brake cylinder delimited by the movable piston and fillable/filled with brake fluid has a maximum volume, while the volume of the chamber is reducible by moving the movable piston into the master brake cylinder, is referred to as a starting position. The movable piston of the master brake cylinder may be understood as, in particular, a rod piston of the master brake cylinder. The specified, limiting brake actuating distance is preferably equal to a maximum possible brake actuating distance, by which the movable piston of the master brake cylinder may be moved, at the most, into the master brake cylinder. In particular, the piston moved by the limiting brake actuating distance may strike a limit stop formed in the master brake cylinder, and may therefore not move further into the master brake cylinder.

The check or assessment, carried out in method step S1, as to whether the brake actuating travel of the movable piston of the master brake cylinder is equal to the specified, limiting brake actuating travel, is carried out with the aid of at least a sensor signal 10, supplied by a sensor, regarding a distance traveled by a driver braking-force transmission component of a brake actuating element of the brake system or by a booster force transmission component of a brake booster of the brake system. The driver braking-force transmission component is a component of the brake actuating element, via which a braking force applied by a driver may be transmitted to the movable piston of the master brake cylinder. The brake actuating element of the brake system may be understood to be, e.g., a brake pedal. The driver braking-force transmission component may be, for example, an input rod.

The booster force transmission component is a component of the brake booster, via which a booster force supplied by the brake booster may be transmitted to the movable piston of the master brake cylinder. The brake booster may be, in particular, an electromechanical brake booster. For example, a booster piston may be referred to as a booster force transmission component of the brake booster. A path of the driver braking-force transmission component or of the booster force transmission component out of a (forceless) starting position, which results from the driver braking force or the booster force, is denoted by the term "distance moved."

Sensor signal 10 is preferably provided by a rotation sensor or a motor current sensor of an electric motor of the brake booster taking the form of an electromechanical brake booster. Such types of sensors may easily be installed on the electromechanical brake booster.

Optionally, even a further sensor signal 12 for checking or estimating, if the brake actuating travel of the movable piston of the master brake cylinder is equal to the specified, limiting brake actuating travel, may be evaluated, as well. Further sensor signal 12 may be, for example, a rod travel signal of a rod travel sensor, regarding the distance moved by the driver braking-force transmission component taking the form of an input rod, or a differential travel signal of a differential travel sensor, regarding a differential distance between the distance moved by the input rod and the distance moved by the booster force transmission component taking the form of a valve body.

Method step S1 may be repeated as often as desired. If it is discerned or assessed, that the brake actuating travel of the movable piston of the master brake cylinder is equal to the specified, limiting brake actuating travel, at least one method step S2 is carried out. As a method step S2, a pump motor control unit of at least one hydraulic pump of the brake system is activated in such a manner, that with the aid of the at least one hydraulic pump controlled by the pump motor control unit, brake fluid is conveyed from a brake fluid reservoir of the brake system into at least one wheel brake cylinder of the brake system. To that end, at least one control signal 14 is outputted to the pump motor control unit. Consequently, even in the case, in which the brake actuating travel of the movable piston of the master brake cylinder is equal to the maximum possible brake actuating travel, and consequently, no further brake actuation into the master brake cylinder is possible anymore, an increase in the brake pressure in the at least one wheel brake cylinder is still produced. Therefore, to execute the method described here, a type of master brake cylinder having a relatively short length of the master brake cylinder, that is, having a relatively small maximum dimension of the master brake cylinder along a direction of movement of its movable piston, may be used without difficulty. Accordingly, the brake booster interacting with the master brake cylinder may also be designed to be shorter along the direction of movement of the movable piston, which, as already explained above, reduces a risk of injury to a driver in the case of a collision of his/her vehicle/motor vehicle.

In response to the discernment or assessment, that the brake actuating travel of the movable piston of the master brake cylinder is equal to the specified, limiting brake actuating travel, it is preferable for a setpoint variable regarding a setpoint volumetric flow to be conveyed from the brake fluid reservoir into the at least one wheel brake cylinder, to be determined, as well. In this case, the pump control unit may be activated by the at least one control signal 14 in such a manner, that an actual volumetric flow corresponding to the setpoint variable is conveyed from the brake fluid reservoir into the at least one wheel brake cylinder with the aid of the at least one hydraulic pump controlled by the pump control unit. The determination of the setpoint variable may take place with the aid of at least sensor signal 10 and/or with the aid of further sensor signal 12. Speeds of the driver braking-force transmission component and/or of the booster force transmission component, e.g., an increase or decrease in the distance moved by the input rod over time, an increase or decrease in the distance moved by the valve body over time, and/or an increase or decrease in the differential travel over time, may also be evaluated to determine the setpoint variable.

As an advantageous further refinement, in a(n) (optional) method step S3, a booster force, which is supplied by the brake booster via the booster force transmission component and is transmitted to the movable piston of the master brake cylinder, may be adapted to the discerned/assessed situation, that the brake actuating travel of the movable piston is equal to the specified, limiting brake actuating travel. The execution of method step S3 is an advantageous further refinement for operating the brake booster, if a setpoint booster variable regarding a setpoint booster force to be generated by the brake booster in accordance with at least a first characteristic curve/normal characteristic curve or a second characteristic curve/force-compensation characteristic curve, is determined during operation of the brake booster, and if, subsequently, the brake booster is controlled with the aid of at least one booster control signal 16 in such a manner, that the brake booster supplies a booster force corresponding to the setpoint booster variable, via the booster force transmission component. As is explained below in more detail, if it is discerned or assessed that the brake actuating travel of the movable piston of the master brake cylinder lies below the specified, limiting brake actuating travel, the setpoint booster force is determined in accordance with the first characteristic curve/normal characteristic curve. In contrast, when method step S3 is executed, since it is discerned or assessed, that the brake actuating travel of the movable piston of the master brake cylinder is equal to the specified, limiting brake actuating travel, the setpoint booster variable is determined in accordance with the second characteristic curve/force-compensation characteristic curve. The second characteristic curve/force-compensation characteristic curve and the first characteristic curve/normal characteristic curve may be, e.g., functions, which assign the distance moved by the driver braking-force transmission component a determined setpoint booster force or a setpoint distance moved by the booster force transmission component corresponding to the setpoint booster force, and/or a corresponding setpoint differential travel between the distance moved by the input rod and the distance moved by the valve body.

The second characteristic curve/force-compensation characteristic curve and the first characteristic curve/normal characteristic curve are preferably determined as functions in such a manner, that in comparison with the first characteristic curve/normal characteristic curve, the second characteristic curve/force-compensation characteristic curve assigns the distance moved by the driver braking-force transmission component a lower setpoint booster force or a lower setpoint distance moved by the booster force transmission component and/or a correspondingly adapted set-point differential travel. In this manner, a brake actuating sensation/pedal sensation of the driver manipulating the brake actuating element is adapted in such a manner, that the driver does not sense/hardly senses a reaction from the movement of the movable piston of the master brake cylinder by the specified, limiting brake actuating distance.

As a further advantageous addition, method step S1 may be repeated at least once after the execution of method step S2 (and possibly, of method step S3). In this case, if it is discerned or assessed, that the brake actuating travel of the movable piston of the master brake cylinder is less than the limiting brake actuating travel, then, in a method step S4, the pump control unit may be triggered by at least a deactivation signal 18 to stop the at least one hydraulic pump controlled by the pump control unit. In addition, in a method step S5, the setpoint booster variable regarding the setpoint booster force of the brake booster to be generated may be determined in accordance with the first characteristic curve/normal characteristic curve, so that the brake booster is subsequently operated again "in a standard manner."

FIGS. 2A through 2F show a schematic representation of a brake system equipped with a specific embodiment of the control unit, as well as coordinate systems for explaining a method of functioning of the control unit.

The brake system schematically represented in FIG. 2A includes a master brake cylinder 20 having at least one movable piston 21. Movable piston 21 may be understood as, e.g., a rod piston of master brake cylinder 20. In addition to the movable piston 21 taking the form of a rod piston, master brake cylinder 20 may optionally include a floating piston, as well.

The brake system also includes a brake actuating element 22 having at least one driver braking-force transmission component 24, via which a driver braking force $F_{driver}$ may be transmitted to movable piston 21 of master brake cylinder 20. Brake actuating element 22 may include, for example, a brake pedal. Driver braking-force transmission component 24 may be, in particular, an input rod.

In addition, the brake system includes a brake booster 26 having at least one booster force transmission component 28, via which a booster force $F_{support}$ supplied by brake booster 26 may be transmitted to movable piston 21 of master brake cylinder 20. Brake booster 26 may be, in particular, an electromechanical brake booster having an electric motor (not shown). Therefore, booster force transmission component 28 may be understood as, for example, a booster piston. However, an ability to develop the brake system is not limited to the use of an electromechanical brake booster as brake booster 26.

A sensor 30 is configured to supply sensor signal 10, which is already described above and is in regard to the distance moved by driver braking-force transmission component 24 of brake actuating element 22 or by booster force transmission component 28 of brake booster 26. Exemplary embodiments of sensor 30 are mentioned again below.

A brake fluid reservoir 32 is also connected to master brake cylinder 20. In addition, at least one hydraulic pump 34 having a pump control unit 36 is connected hydraulically to master brake cylinder 20. Master brake cylinder 20 is preferably configured in such a manner with collapsible seals for sealing its at least one expansion bore, that in response to the presence of a suction pressure in master brake cylinder 20 produced with the aid of the at least one pump 34, its seals collapse and consequently allow liquid to flow through. In this case, the at least one pump 34 may also still draw in brake fluid from brake fluid reservoir 32 via master brake cylinder 20 after the sealing of its at least one expansion bore.

The at least one pump 34, along with its pump control unit 36, may be, in particular, part of an ESP (electronic stability program) system of the brake system. In addition, the brake system includes at least one wheel brake cylinder 38, which is connected hydraulically to a delivery side of the at least one pump 34.

The brake system additionally includes a control unit 40, as well, which, in the specific embodiment of FIGS. 2A through 2F, is, by way of example, a subunit of brake booster 26. Thus, control unit 40 may be referred to as a brake booster control unit. Control unit 40 may be integrated, in particular, within a housing of the brake booster. However, it is emphasized that control unit 40 may also perform its function described in the following, if it is set apart/separate from brake booster 26 in the brake system.

With the aid of at least the sensor signal 10, which is provided by sensor 30 and is in regard to the distance moved by driver braking-force transmission component 24 or by booster force transmission component 28, control unit 40 is configured to discern or assess if movable piston 21 of master brake cylinder 20 is moved from its starting position into master brake cylinder 20 by a brake actuating distance s equal to a specified, limiting brake actuating distance s0. A displacement of driver braking-force transmission component 24 or booster force transmission component 26 out of a (forceless) starting position, which is produced by driver braking force $F_{driver}$ or booster force $F_{support}$, is denoted by the term "distance moved." Limiting brake actuating distance s0 may be understood as, in particular, a maximum possible brake actuating distance s, by which movable piston 21 may be moved, at the most, into master brake cylinder 20. In particular, master brake cylinder 20 may be formed in such a manner, that the piston 21 moved by limiting brake actuating distance s0 strikes a limit stop and may therefore not move further into master brake cylinder 20.

If control unit 40 discerns or estimates that brake actuating distance s of movable piston 21 of master brake cylinder 20 is equal to specified, limiting brake actuating distance s0, then control unit 40 is configured to output the at least one control signal 16 already described above to pump control unit 36 of the at least one hydraulic pump 34, through which the pump control unit may be activated/is activated in such a manner, that brake fluid may be conveyed/is conveyed from brake fluid reservoir 32 into the at least one wheel brake cylinder 38 with the aid of the at least one hydraulic pump 34 controlled by pump control unit 36.

Consequently, even when movable piston 21 of master brake cylinder 20 strikes a limit stop, if no more movement of the piston 21 moved into master brake cylinder 20 by the limiting brake actuating distance s0, is possible, control unit 40 may ensure that a further increase in brake pressure is produced in the at least one wheel brake cylinder 38. Consequently, control unit 40 is suitable for an MVR (master cylinder volume replacement) function, which means that a safety factor of a vehicle/motor vehicle equipped with the brake system is improved.

Thus, control unit 40 renders the provision of a "reserve volume" capable of being forced out of master brake cylinder 20 with the aid of movable piston 21, superfluous. Therefore, a length of master brake cylinder 20, that is, a maximum dimension of master brake cylinder 20 along a direction of movement of its movable piston 21, may be shorter than in the case of the related art. Brake booster 26 may also be designed to be shorter along the direction of movement of movable piston 21, which is why brake booster 26 may be mounted more easily to the vehicle/motor vehicle, without brake booster 26 extending (far) into a passenger compartment of the vehicle/motor vehicle. This contributes to a reduction in the risk of injury to a driver of the vehicle/motor vehicle in the case of an crash of his/her vehicle/motor vehicle.

With the aid of at least the sensor signal 10, which is in regard to the distance moved by booster force transmission component 38 and is provided by a rotation sensor or a motor current sensor of an electric motor of the brake booster 26 taking the form of an electromechanical brake booster, control unit 40 is preferably configured to discern or assess if brake actuating travel s of movable piston 21 of master brake cylinder 20 is equal to specified, limiting brake actuating travel s0. Thus, the rotation sensor or the motor current sensor of the electric motor may be used as sensor 30, as well. Since, as a rule, the electric motor is already equipped with such a type of sensor, control unit 40 may be used without expanding the sensor system of the brake system.

Additionally taking into consideration the further sensor signal 12 already mentioned above, as an option, control unit 40 may also be configured to discern or assess if brake actuating travel s of movable piston 21 of master brake cylinder 20 is equal to specified, limiting brake actuating travel s0. Further sensor signal 12 may be, for example, a rod travel signal of a rod travel sensor on the driver braking-force transmission component 24 taking the form of an input rod (the signal being in regard to the distance moved by the input rod) or a differential travel signal of a differential travel sensor (the signal being in regard to a differential distance Δ between the distance moved by the input rod and the distance moved by the booster force transmission component 28 taking the form of a booster piston). Consequently, conventional types of sensors may interact with control unit 40.

As an advantageous further refinement, if control unit 40 discerns or assesses that brake actuating travel s of movable piston 21 of master brake cylinder 20 is equal to specified, limiting brake actuating travel s0, then, with the aid of at least the provided sensor signal 10 and/or further sensor signal 12, control unit 40 may be additionally configured to determine a setpoint variable regarding a setpoint volumetric flow to be conveyed from brake fluid reservoir 32 into the at least one wheel brake cylinder 38, and to activate pump control unit 36 with the aid of the at least one control signal 16, in such a manner, that an actual volumetric flow Q corresponding to the setpoint variable may be conveyed/is conveyed from brake fluid reservoir 32 into the at least one wheel brake cylinder 38 with the aid of the at least one hydraulic pump 34 activated by pump control unit 36. Thus, the conveyance of brake fluid 34 from brake fluid reservoir 32 into the at least one wheel brake cylinder 38 may be adapted to an inputted braking intent of the driver.

Control unit 40 may also be configured to perform further functions. For example, with the aid of at least supplied sensor signal 10 and/or further sensor signal 12, control unit 40 may also be configured to determine a setpoint booster variable regarding the setpoint booster force to be generated by brake booster 26, and to control brake booster 26, using the at least one booster control signal 16 already mentioned above, in such a manner, that brake booster 16 supplies a booster force $F_{support}$ corresponding to the setpoint booster variable, via booster force transmission component 28.

Consequently, control unit 40 may also perform the functions of a conventional brake booster control unit without difficulty.

As an advantageous further refinement, if control unit 40 discerns or estimates that brake actuating travel s of movable piston 21 of master brake cylinder 20 is less than specified, limiting brake actuating travel s0, control unit 40 may be additionally configured to determine the setpoint booster variable in accordance with a specified, first characteristic curve, and if control unit 40 discerns or assesses that brake actuating travel s of movable piston 21 of master brake cylinder 20 is equal to specified, limiting brake actuating travel s0, the control unit may be configured to determine the setpoint booster variable in accordance with a specified, second characteristic curve. The first and second characteristic curves may be, e.g., functions, which assign the distance moved by driver braking-force transmission component 24 a determined setpoint booster force or a setpoint distance moved by booster force transmission component 28 corresponding to the setpoint booster force and/or a corresponding setpoint differential distance between the distance moved by the input rod and the distance moved by the valve body. The first and second characteristic curves are preferably determined as functions in such a manner, that in comparison with the first characteristic curve, the second characteristic curve assigns the distance moved by driver braking-force transmission component 24 a lower setpoint booster force or a lower setpoint distance traveled by booster force transmission component 28 and/or a correspondingly adapted setpoint differential distance. Thus, the first characteristic curve may be referred to as a normal characteristic curve, while the second characteristic curve may be described as a force-compensation characteristic curve. Using the change of characteristic curve described here, a brake actuating sensation/pedal sensation of the driver manipulating brake actuating element 22 may be adapted in such a manner, that the driver does not sense/hardly senses a reaction from the movement of movable piston 21 of master brake cylinder 20 by specified, limiting brake actuating distance s0. In particular, in response to discerning or assessing that brake actuating travel s of movable piston 21 of master brake cylinder 20 is equal to specified, limiting brake actuating travel s0, with the aid of the change of characteristic curve described here, booster force $F_{support}$ of brake booster 26 may be limited in such a manner, that the driver is not prompted to attempt to push away a limit stop acting against movable piston 21, since the "action of brake actuating element 22" perceived by the driver in the process would irritate the driver.

The method of functioning of control unit 40 is explained again in a schematic manner with the aid of the coordinate systems of FIGS. 2B through 2F:

The abscissa in each of the coordinate systems of FIGS. 2B through 2F is a time axis t. Brake actuating travel s of movable piston 21 of master brake cylinder 20 is indicated by an ordinate of the coordinate system of FIG. 2B. An ordinate of the coordinate system of FIG. 2C indicates differential travel Δ. The actual volumetric flow Q, effected by the at least one hydraulic pump 34, from brake fluid reservoir 32 into the at least one wheel brake cylinder 38 is indicated by an ordinate of the coordinate system of FIG. 2D. The ordinates of the coordinate systems of FIGS. 2E and 2F represent a brake pressure $p_{38}$ present in the at least one wheel brake cylinder 38 and an internal pressure $p_{20}$ present in master brake cylinder 20.

At time t0, the driver manipulates his/her brake actuating element 32. However, brake actuating travel s of movable piston 21 of master brake cylinder 20 remains below specified, limiting brake actuating travel s0 up to time t3. Brake actuating travel s of movable piston 21 of master brake cylinder 20 is only equal to specified, limiting brake actuating travel s0 at or beyond time t3, which is why the at least one hydraulic pump 34 is also only activated as of time t3. The at least one hydraulic pump 34 generates a suction pressure in master brake cylinder 20 as of time t3, which is why internal pressure $p_{20}$ of the master brake cylinder falls to (nearly) zero. At the same time, the at least one hydraulic pump 34 conveys brake fluid from brake fluid reservoir 32 into the at least one wheel brake cylinder 38, so that the brake pressure $p_{38}$ present in the at least one wheel brake cylinder 38 increases. As is apparent from the coordinate system of FIG. 2D, the actual volumetric flow Q produced with the aid of the at least one hydraulic pump 34 may continue to be adapted to the braking intent of the driver. At the same time, differential travel Δ may be adjusted in such a manner, that the driver continues to have a standard brake actuating sensation/pedal sensation.

As of time t4, brake actuating travel s of movable piston 21 of master brake cylinder 20 is less than specified, limiting brake actuating travel s0 again. Therefore, as of time t4, the at least one hydraulic pump 34 is in its inactive mode again.

It is emphasized that an ability to use control unit 40/the brake system configured with it is not limited to any particular type of vehicle/motor vehicle. Communication between control unit 40, sensor 30, pump control unit 36 and, possibly, brake booster 16, may take place over a network, for example, over a CAN (controller area network) or via a FlexRay.

What is claimed is:

1. A control unit for a brake system of a vehicle, the control unit configured to:
   discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system; and
   output, based on the discerning or assessing, at least one control signal to a pump control unit of at least one hydraulic pump of the brake system, the pump control unit being configured to be activated by the at least one control signal in such a manner that brake fluid may be conveyed from a brake fluid reservoir of the brake system into at least one wheel brake cylinder of the brake system using the at least one hydraulic pump controlled by the pump control unit, wherein the control unit is configured to discern or assess whether the brake actuating distance of the movable piston of the master brake cylinder is equal to the specified, limiting brake actuating distance, using at least the sensor signal, which is in regard to the distance moved by the booster force transmission component and is provided by a rotation sensor or a motor current sensor of an electric motor of the brake booster taking the form of an electromechanical brake booster.

2. The control unit as recited in claim 1, wherein the control unit is configured to discern or assess whether the brake actuating distance of the movable piston of the master brake cylinder is equal to the specified, limiting brake actuating distance, taking into consideration a rod travel signal of a rod travel sensor on the driver braking-force transmission component taking the form of an input rod.

3. A control unit for a brake system of a vehicle, the control unit configured to:
   discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system; and
   output, based on the discerning or assessing, at least one control signal to a pump control unit of at least one hydraulic pump of the brake system, the pump control unit being configured to be activated by the at least one control signal in such a manner that brake fluid may be conveyed from a brake fluid reservoir of the brake system into at least one wheel brake cylinder of the brake system using the at least one hydraulic pump controlled by the pump control unit, wherein the control unit is configured to, in light of at least the sensor signal and/or a differential travel signal of a differential travel sensor of the brake booster taking the form of an electromechanical brake booster and/or a rod travel signal of a rod travel sensor on the driver braking-force transmission component taking the form of an input rod, determine a setpoint booster variable regarding a setpoint booster force to be produced using the brake booster, and to control the brake booster using at least a booster control signal in such a manner, that the brake booster provides a booster force corresponding to the setpoint booster variable, via the booster force transmission component.

4. The control unit as recited in claim 3, wherein, when the control unit discerns or assesses that the brake actuating distance of the movable piston of the master brake cylinder is less than the specified, limiting brake actuation travel, the control unit is additionally configured to determine the setpoint booster variable in accordance with a specified, first characteristic curve, and when the control unit discerns or assesses that the brake actuating distance of the movable piston of the master brake cylinder is equal to the specified, limiting brake actuating distance, the control unit is configured to determine the setpoint booster variable in accordance with a specified, second characteristic curve.

5. A control unit for a brake system of a vehicle, the control unit configured to:
   discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system; and
   output, based on the discerning or assessing, at least one control signal to a pump control unit of at least one hydraulic pump of the brake system, the pump control unit being configured to be activated by the at least one control signal in such a manner that brake fluid may be conveyed from a brake fluid reservoir of the brake system into at least one wheel brake cylinder of the brake system using the at least one hydraulic pump controlled by the pump control unit, wherein the control unit is configured to discern or assess whether the brake actuating distance of the movable piston of the master brake cylinder is equal to the specified, limiting brake actuating distance, taking into consideration a differential travel signal of a differential travel sensor of the brake booster taking the form of an electromechanical brake booster.

6. A control unit for a brake system of a vehicle, the control unit configured to:

discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system; and output, based on the discerning or assessing, at least one control signal to a pump control unit of at least one hydraulic pump of the brake system, the pump control unit being configured to be activated by the at least one control signal in such a manner that brake fluid may be conveyed from a brake fluid reservoir of the brake system into at least one wheel brake cylinder of the brake system using the at least one hydraulic pump controlled by the pump control unit, wherein the control unit is configured to, when the control unit discerns or estimates that the brake actuating distance of the movable piston of the master brake cylinder is equal to the specified, limiting brake actuating distance, using at least the sensor signal and/or a differential travel signal of a differential travel sensor of the brake booster taking the form of an electromechanical brake booster and/or a rod travel signal of a rod travel sensor on the driver braking-force transmission component taking the form of an input rod, determine a setpoint variable regarding a setpoint volumetric flow to be conveyed from the brake fluid reservoir into the at least one wheel brake cylinder, and activate the pump control unit using the at least one control signal, in such a manner, that an actual volumetric flow corresponding to the setpoint variable may be conveyed from the brake fluid reservoir into the at least one wheel brake cylinder using the at least one hydraulic pump controlled by the pump control unit.

7. A brake booster for a brake system of a vehicle, comprising:

a control unit configured to:

discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system; and based on the discerning or assessing, output at least one control signal to a pump control unit of at least one hydraulic pump of the brake system, the pump control unit being configured to be activated by the at least one control signal in such a manner, that brake fluid may be conveyed from a brake fluid reservoir of the brake system into at least one wheel brake cylinder of the brake system using the at least one hydraulic pump controlled by the pump control unit, wherein the control unit is configured to discern or assess whether the brake actuating distance of the movable piston of the master brake cylinder is equal to the specified, limiting brake actuating distance, using at least the sensor signal, which is in regard to the distance moved by the booster force transmission component and is provided by a rotation sensor or a motor current sensor of an electric motor of the brake booster taking the form of an electromechanical brake booster.

8. A brake system for a vehicle, comprising:

a control unit configured to:

discern or assess whether a movable piston of a master brake cylinder of the brake system is moved from its starting position into the master brake cylinder by a brake actuating distance equal to a specified, limiting brake actuating distance, using at least a sensor signal which is provided by a sensor and is in regard to a distance moved by a driver braking-force transmission component of a brake actuating element of the brake system or by a booster force transmission component of a brake booster of the brake system, and based on the discerning or assessing, output at least one control signal to a pump control unit of at least one hydraulic pump of the brake system, the pump control unit being configured to be activated by the at least one control signal in such a manner, that brake fluid may be conveyed from a brake fluid reservoir of the brake system into at least one wheel brake cylinder of the brake system using the at least one hydraulic pump controlled by the pump control unit;

the master brake cylinder having at least the movable piston;

the brake actuating element having at least the driver braking-force transmission component, via which a driver braking force may be transmitted to the movable piston of the master brake cylinder;

the brake booster having at least the booster force transmission component, via which a booster force supplied by the brake booster may be transmitted to the movable piston of the master brake cylinder;

the sensor configured to supply the sensor signal, which is in regard to the distance moved by the driver braking-force transmission component of the brake actuating element or by the booster force transmission component of the brake booster, to the control unit;

the brake fluid reservoir connected to the master brake cylinder;

the at least one hydraulic pump connected to the master brake cylinder including its pump motor control unit; and the at least one wheel brake cylinder connected to a delivery side of the at least one hydraulic pump.

9. A method for operating a brake system of a vehicle, comprising the following steps:

using at least a sensor signal, which is provided by a sensor and is in regard to a distance moved by a driver braking-force transmission component of a brake actuating element of the brake system or by a booster force transmission component of a brake booster of the brake system, checking or assessing whether a movable piston of a master brake cylinder of the brake system is moved from its starting position into the master brake cylinder by a brake actuating distance equal to a specified, limiting brake actuating distance; and based on discerning or estimating that the brake actuating travel of the movable piston of the master brake cylinder is equal to the specified, limiting brake actuating travel, activating a pump motor control unit of at least one hydraulic pump of the brake system in such a manner, that brake fluid is conveyed from a brake fluid reservoir of the brake system into at least one wheel brake cylinder of the brake system using the at least one hydraulic pump controlled by the pump motor control unit, wherein whether the brake actuating travel of the movable piston of the master brake cylinder is equal to the specified, limiting brake actuating travel is discerned or estimated using at least the sensor signal, which is in regard to a distance moved by a booster force transmission component and is provided by a rotation sensor or a motor current sensor of an electric motor of the brake booster taking the form of an electromechanical brake booster.

\* \* \* \* \*